US005481653A

United States Patent [19]
Kashiwagi et al.

[11] Patent Number: 5,481,653
[45] Date of Patent: Jan. 2, 1996

[54] DIGITAL IMAGE PROCESSING APPARATUS FOR SYNTHESIZING AN IMAGE FORM AT LEAST TWO IMAGES

[75] Inventors: Kenichi Kashiwagi, Kawasaki; Masami Matsumoto, Tokyo, both of Japan

[73] Assignee: Canon Kabushiki Kaisha, Tokyo, Japan

[21] Appl. No.: 287,412

[22] Filed: Aug. 9, 1994

Related U.S. Application Data

[63] Continuation of Ser. No. 557,011, Jul. 25, 1990, abandoned.

[30] Foreign Application Priority Data

Jul. 26, 1989 [JP] Japan .................................. 1-192909

[51] Int. Cl.⁶ ........................................... G06T 5/00
[52] U.S. Cl. ...................... 395/100; 395/133; 395/135; 395/138; 364/413.19
[58] Field of Search ....................... 395/100, 117, 395/118, 123, 133–139, 141, 153, 155–161; 364/413.02, 413.13, 413.19, 413.22; 358/505, 515, 517, 524, 528, 537–540; 382/2

[56] References Cited

U.S. PATENT DOCUMENTS

| | | | |
|---|---|---|---|
| 4,528,627 | 7/1985 | Coben | 364/413.02 X |
| 4,672,683 | 6/1987 | Matsueda | 340/707 X |
| 4,737,927 | 4/1988 | Hanabusa et al. | 395/135 |
| 4,739,481 | 4/1988 | Yoshitome | 364/413.19 |
| 4,824,238 | 4/1989 | Feldman et al. | 351/206 |
| 4,841,575 | 6/1989 | Welsh et al. | 382/2 X |
| 4,954,883 | 9/1990 | Belmares-Sarabis et al. | 358/22 |
| 5,037,194 | 8/1991 | Kohayakawa et al. | 351/224 |
| 5,148,499 | 9/1992 | Matsumura | 364/413.19 |
| 5,179,642 | 1/1993 | Komatsu | 395/135 |
| 5,271,097 | 12/1993 | Barker et al. | 395/135 |
| 5,319,550 | 6/1994 | Griffith | 364/413.19 |

FOREIGN PATENT DOCUMENTS

| | | |
|---|---|---|
| 62-140172 | 6/1987 | Japan . |
| 6423677 | 1/1989 | Japan . |

*Primary Examiner*—Almis R. Jankus
*Attorney, Agent, or Firm*—Fitzpatrick, Cella, Harper & Scinto

[57] ABSTRACT

An image processing apparatus includes a memory for storing data representing a digital mask pattern for extracting only a plurality of two-dimensional discrete images from a first image, a generator for generating data representing a synthesized image including a plurality of discrete two-dimensional images from the first image with the digital mask pattern, a display for displaying the synthesized image and a second image in an overlapped state, and a memory for storing data representing first and second images so that a common image portion, common to the first and second digital images is stored therein.

10 Claims, 7 Drawing Sheets

PRIOR ART

FIG. 13

PRIOR ART

DIGITAL IMAGE PROCESSING APPARATUS FOR SYNTHESIZING AN IMAGE FORM AT LEAST TWO IMAGES

This application is a continuation of application Ser. No. 07/557,011 filed Jul. 25, 1990, now abandoned.

BACKGROUND OF THE INVENTION

1. Field of the Invention

This invention relates to an image processing apparatus, and more particularly, to an apparatus which can easily perform registration of a plurality of digital fundus (eye-grounds) images before performing image processing, such as addition, subtract;ion or the like, of the images.

2. Description of the Prior Art

Heretofore, in order to satisfy the requirements to observe the mutual positional relationship among blood vessels, hemorrhages (bleeding), vitiligo, and the like on a retina, a fundus photograph over a wide angle of view has been prepared by adding a plurality of fundus photographs so that the positional relationship among the respective photographs coincides with one another in up and down, right and left, and oblique directions.

Recently, with the progress of image processing techniques, synthesis of digital images has been performed by inputting fundus images using a general-purpose image processing apparatus, and utilizing image processing techniques, such as the affine transformation and the like.

Furthermore, a technique has been disclosed in Japanese Patent Public Disclosure (Kokai) Nos. 64-23677 (1989) and 62-140172 (1987), in which see-through synthesis of a plurality of images is performed for a plurality of stored image data using address generation means.

However, in conventional techniques utilizing analog images, it takes time until a fundus photograph is developed, printed, and the like.

Figure 12:
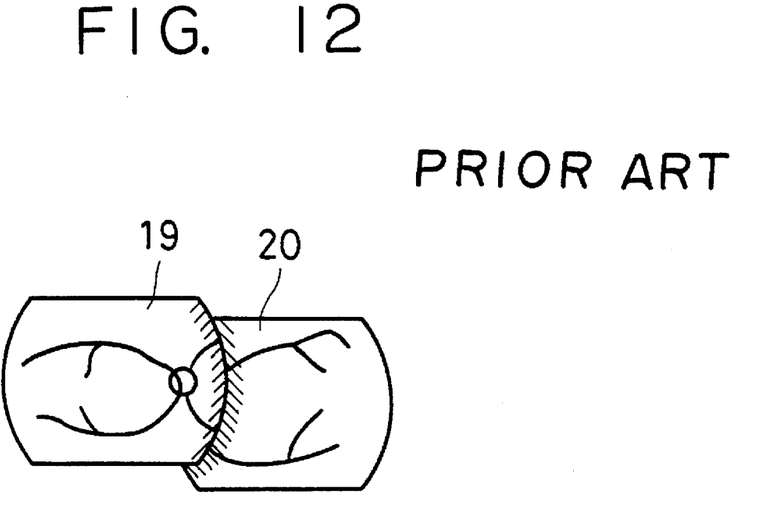
FIGS. 12 and 13 shows conventional examples of how fundus photographs are combined.

Even in conventional techniques utilizing digital images, it is difficult to perform an exact synthesis, since a synthesis must be performed according to information around a boundary (the hatched portion) between, for example, fundus images 19 and 20 shown in FIG. 12.

Figure 13:
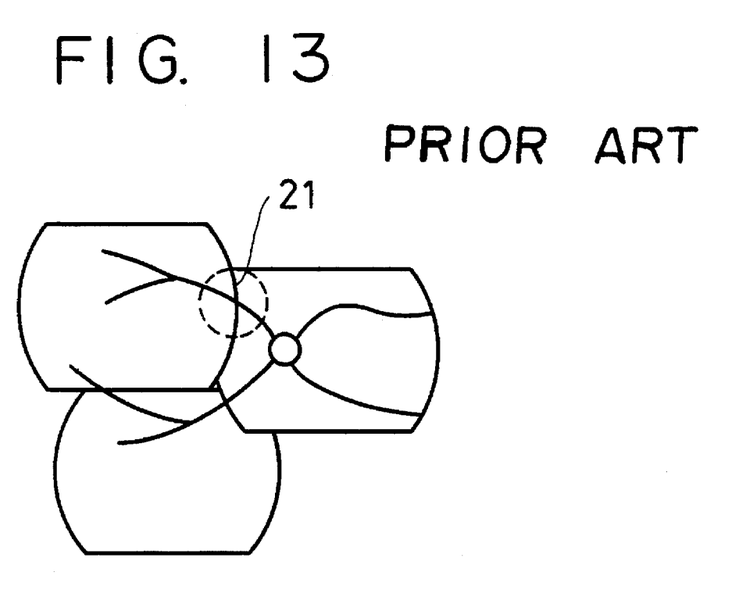

Furthermore, there is also a disadvantage in conventional techniques in that each image is distorted due to the fundus camera, and deviation thereby occurs at numeral 21 in FIG. 13. Hence, it is difficult to exactly adjust the images.

Moreover, when the address generation means as shown in the above-described Disclosures is used, there is a disadvantage in that address control becomes complicated when a plurality of images are synthesized in a state in which the images are rotated relative to one another.

SUMMARY OF THE INVENTION

It is an object of the present invention to provide an image processing apparatus which can simply recognize a state of registration including rotation of a digital image A relative to a digital image B.

It is another object of the present invention to provide an image processing apparatus which can prepare a fundus image having a wide angle of view by accurately synthesizing and adding a plurality of fundus blood vessel images.

It is still another object of the present invention to provide an image processing apparatus which can accurately detect a change in symptoms of the eye by comparing past image data with present image data of an identical eye to be inspected.

The present invention which achieves these objectives, relates to an image processing apparatus. The apparatus comprises means for storing digital data representing a mask pattern image for extracting only digital data representing a plurality of two-dimensional discrete images from a first image. The apparatus also comprises means for generating digital data representing a synthesized image comprising digital data representing a plurality of discrete two-dimensional discrete images from the first image with the mask pattern image. In addition, the apparatus comprises means for displaying the synthesized image and a second image in an overlapped state. Further, the apparatus comprises means for storing digital data representing the first and second images so that digital data representing a common image portion, common to the first and second images, is stored therein.

The apparatus further comprises means for subjecting the digital data representing the first and second images to additive and/or subtractive processing as image processing. The digital data can represent the mask pattern image for extracting only digital data representing a plurality of images from the digital data representing the first image having a checkered pattern. In addition, the first and second images can be fundus images. In this case the apparatus can further comprise means for removing digital data representing an aperture mask from digital data representing fundus images. The apparatus can also comprise means for correcting digital data representing fundus images for distortion aberration generated by a fundus camera.

DETAILED DESCRIPTION OF THE PREFERRED EMBODIMENTS

Figure 1:
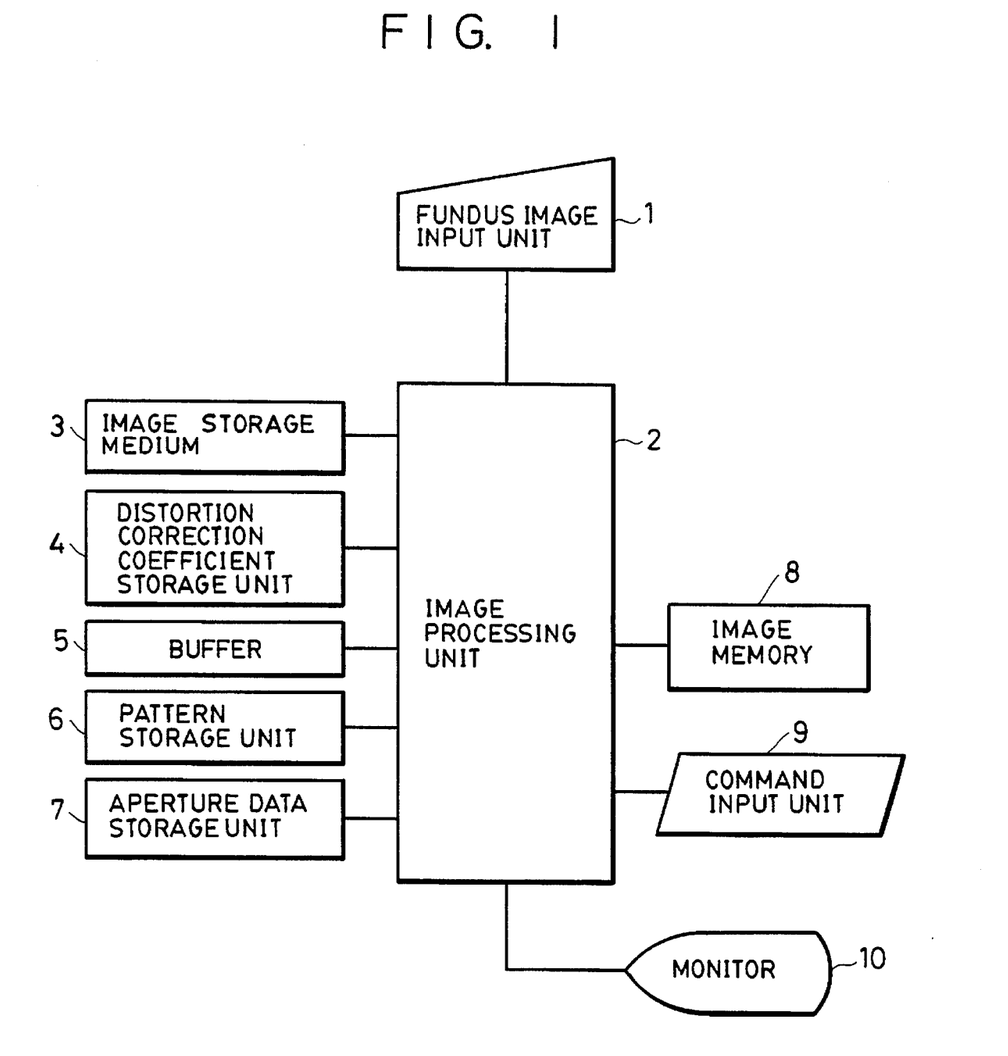
FIGS. 1 and 2 show the entire configuration and a process flowchart of a first embodiment of the present invention, respectively.

FIG. 1 shows a first embodiment of the present invention. In FIG. 1, there are shown a fundus image input unit 1, an image processing unit 2, an image storage medium 3, and a distortion (distortion aberration) correction coefficient storage unit 4 for a fundus camera. A buffer 5 stores image storing address information of the image storage medium 3. A pattern storage unit 6 stores data representing see-through patterns used in see-through synthesis. An aperture data storage unit 7 stores various aperture data for fundus images. There is also shown an image memory 8. A command input unit 9 transmits various commands to the image processing unit 2. A monitor 10 displays an image.

Figure 2:
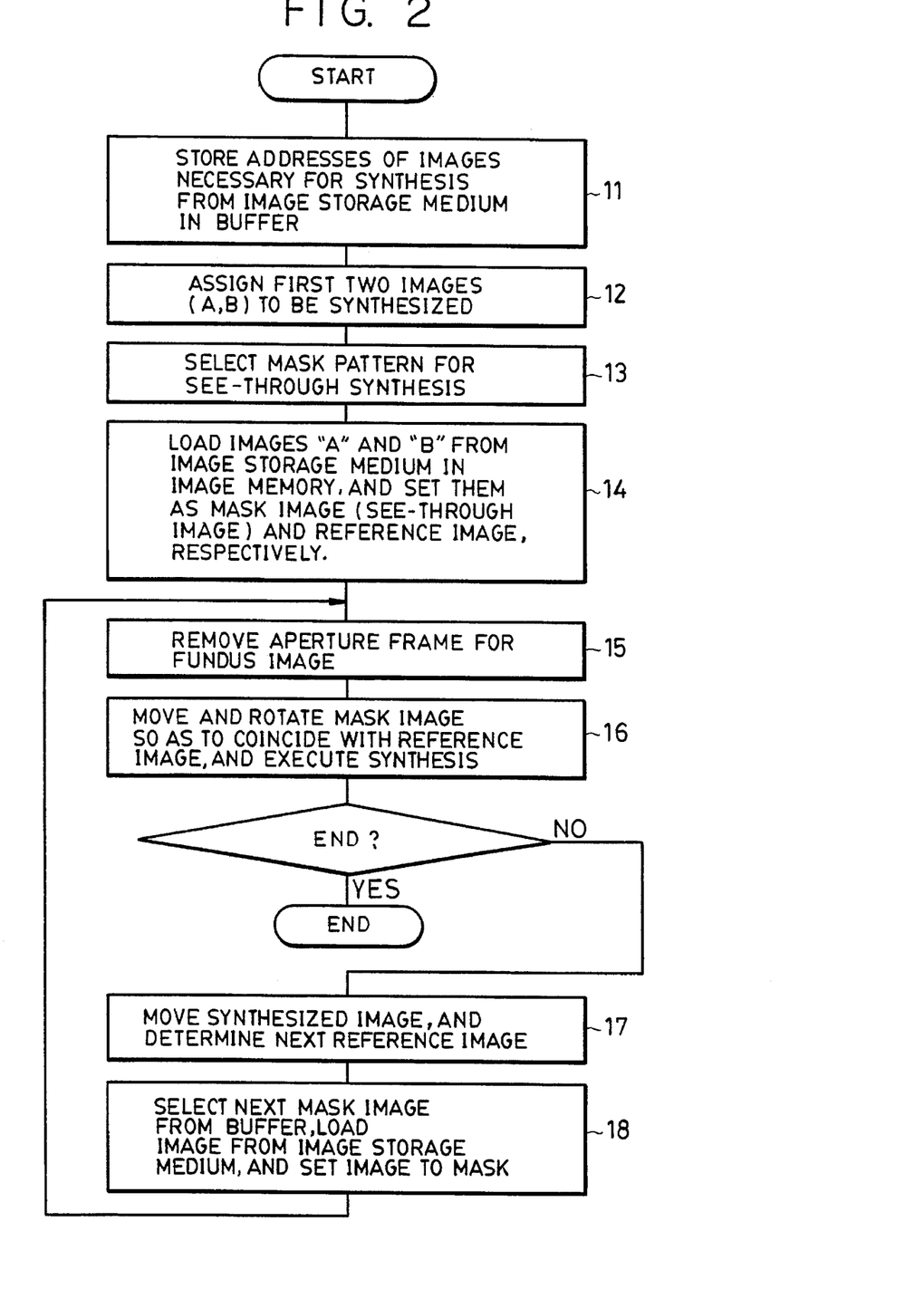

FIG. 2 is a flowchart showing a processing program of synthesis by addition according to the first embodiment of the present invention.

A specific method of executing image synthesis will now be explained with reference to FIGS. 1 and 2. First, as a preparatory operation for image synthesis, digital images of a fundus retina are input by the fundus image input unit 1.

Digital data representing images of a fundus retina can be input by 1) a method in which a fundus retina of an eye to be inspected is imaged by a CCD camera mounted on a fundus camera, and image data are input via an A/D converter, 2) a method in which fundus images already provided in a slide frame or the like are input using a slide scanner, and 3) a method in which images recorded in a still-picture video camera or a VCR (video cassette recorder) are input via an A/D converter.

The input digital data representing the images are stored in the image storage medium 3. Specifically, an optical disk, a magnetooptical disk, a hard disk or the like may be used as the image storage medium 3.

When the distortion of the digital data representing the fundus images stored in the image storage medium 3 due to the fundus camera is corrected, a correction coefficient or the fundus camera which has imaged the fundus images to be corrected is loaded from the correction coefficient storage unit 4 storing correction coefficients for distortion in various kinds of fundus cameras, and correction is performed by the image processing unit 2.

Figure 3:
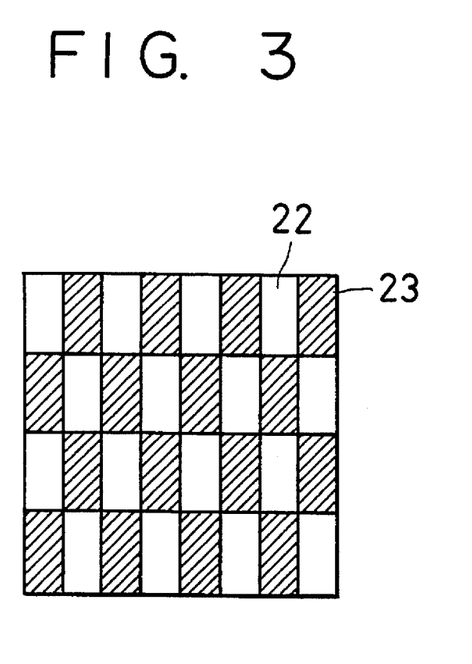
FIG. 3 shows a mask pattern used for see-through display.

After the completion of the above-described preparation, a command input from the command input unit 9 assigns digital data representing images to be used for synthesis from among fundus images stored in the image storage medium 3, and image storing address information for digital data representing the assigned images is stored in the buffer 5 (step 11 in FIG. 2). First digital data representing two images to be synthesized are then assigned from among the image addresses which have been stored in the buffer 5 by a command operation from the command input unit 9, and image storing address information for digital data representing the assigned images (for example, images A and B) is stored in the buffer 5 (step 12 in FIG. 2). Subsequently, digital data representing a mask pattern as shown in FIG. 3, that is, a mask pattern used for synthesis is selected from the mask pattern storage unit 6 storing digital data representing various images, each of which is synthesized with digital data representing a certain image (for example, image A) in order to display an image A' obtained by extracting only a plurality of discrete picture elements, and digital data representing a digital mask pattern image Z is loaded in the image memory 8.

Figure 4:
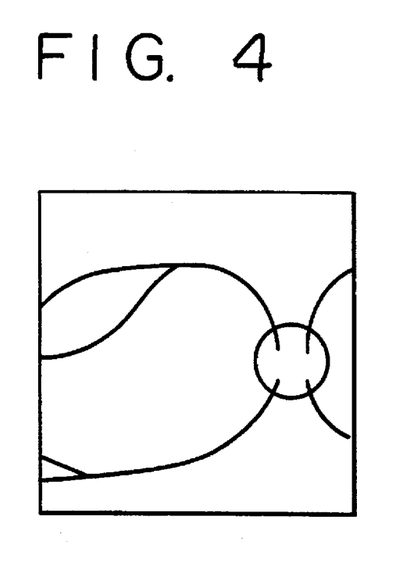
FIG. 4 shows a fundus image B set as a reference image.

Digital data representing the assigned images A and B are also loaded in the image memory 8 from the image storage medium 3 according to the image storing address information. Digital data representing one of the two images, i.e., the image B is set as digital data representing a reference image (see FIG. 4). Digital data representing another image, i.e., the image A is loaded in the memory which stores digital data representing the mask pattern image, and digital data representing an image obtained by synthesizing it with digital data representing the mask pattern image Z is set as digital data representing an image A' (see FIG. 5). The synthesis of digital data representing the image A with digital data representing the image Z is performed by the image processing unit 2. These images A' and B are displayed by being superposed by a known pattern matching function within the image processing unit 2, as will be described later. In the superposed region, picture elements of images B and A' are taken in sections 22 and 23 shown in FIG. 3, respectively, and are displayed in a see-through state.

Figure 6:
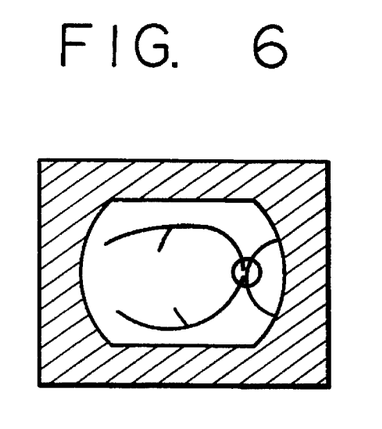
FIG. 6 shows an aperture mask for a fundus image.
Figure 7:
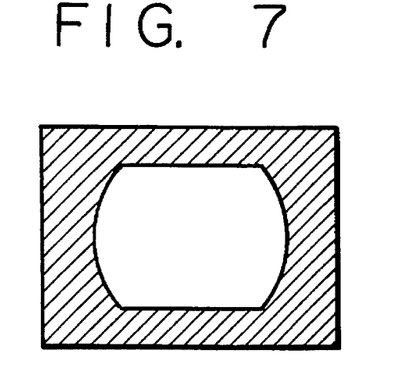
FIG. 7 shows a digital image for aperture elimination for removing the aperture mask from the fundus image.
Figure 8:
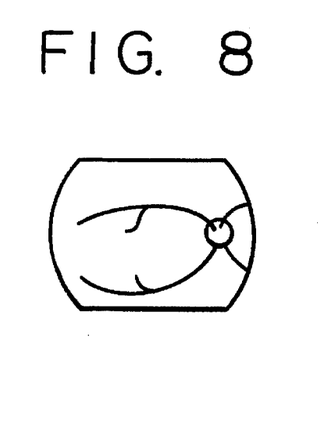
FIG. 8 shows the fundus image after the aperture mask has been removed.

When there is an aperture for a fundus image as shown in FIG. 6, in order to remove the aperture, digital data representing an image for aperture elimination as shown in FIG. 7, corresponding to the image A or B, is loaded from the aperture data storage unit 7, and image subtraction is performed by the image processing unit 2. An image without an aperture can thus be obtained, as shown in FIG. 8.

Figure 5:
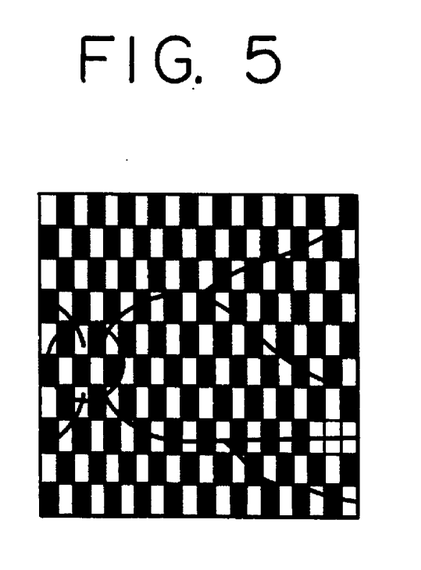
FIG. 5 shows a fundus image A' obtained by synthesizing a fundus image A with a mask pattern Z.

The above-described superposed display is executed using the images A' and B without apertures. The image A' as shown in FIG. 5 is moved in up and down, right and left, and oblique directions relative to the image B while watching the image monitor 10 by a command operation from the command input unit 9. An approximate position (in X and Y directions) is first adjusted.

In this movement, it is possible to change the moving speed by an operation from the command input unit 9.

Subsequently, in order to adjust the images in a direction θ, the image A' is rotated relative to the image B around a portion which is common for the two images A' and B, that is an overlapped portion (for example, a crossing portion or a branching portion of blood vessels, or the like) to perfectly match it with the reference image B. A specific method for this operation will be hereinafter explained.

That is, a pair of portions (for example, a crossing portion, a branching portion of blood vessels, and the like), which seem to be common for the two images A' and B, are assigned by an operation from the command input unit 9 while watching the image monitor 10, and a straight line connecting the pair of portions is drawn for each image. The image A' is then rotated so that straight lines for the two images become parallel to each other, and the images A' and B are perfectly matched.

Digital data representing an image X, in which the images A and B are perfectly matched with each other when the two-dimensional registration state between the images A' and B becomes optimal, is then stored in the image memory 8.

The above-described movement and rotation of the image A' may be performed automatically or semi-automatically as well as manually by a method of assigning characteristics of the image A' and the reference image B, or the like.

The image X, in which images A and B are perfectly matched with each other, is then moved in up and down, right and left, and oblique directions within the display picture frame by a command input from the command input unit 9 in a state in which the images A and B are perfectly matched, and finally the next reference image is determined. Digital data representing an image C' obtained by synthesizing an image C with digital data representing the mask pattern image is selected from among the digital data representing various images, the addresses of which are stored in the buffer 5. The digital data representing image C' is set so that digital data representing the image C' is synthesized with the digital data representing reference image X (the digital data representing image in which the images A and B are perfectly matched with each other) in the image memory 8 previously selected from the image storage medium 3, for example, so that digital data representing the image C' is moved relative to the reference image X by rotation and movement and synthesized so that image C' is joined to reference image X at a position corresponding to the image B within the synthesized image X made of the images A and B. Digital data representing an image Y, in which the images X and C are perfectly matched with each other when the two-dimensional registration state between the images C' and X becomes optimal, is then stored in the image memory 8.

At this time, if it is intended to change digital data representing the mask pattern, digital data representing a desired pattern is selected from among the digital data representing the patterns stored in the pattern storage unit 6 by a command from the command input unit 9, and digital data representing the selected mask image is set in the image memory 8.

Steps 15–18 shown in FIG. 2 are then repeated a required number of times to execute the synthesis of the image.

In the above-described method of synthesis, it is assumed that digital data representing a large number of images are stored in the image storage medium 3. Since it takes time if digital data representing images to be synthesized are retrieved every time from the image storage medium 3, a buffer is utilized in order to shorten the retrieval time. However, if the number of images stored as digital data is small, it is possible to perform retrieval directly from the image storage unit medium without using a buffer.

As for the mask pattern used for see-through synthesis, in view of the low contrast of eyegrounds, a pattern having a zigzag arrangement, in which each of the extracting portion 22 and the transparent portion 23 has one picture element in the horizontal direction and a plurality of picture elements in the vertical direction, may also be used in place of the checkered pattern as shown in FIG. 3.

Figure 9:
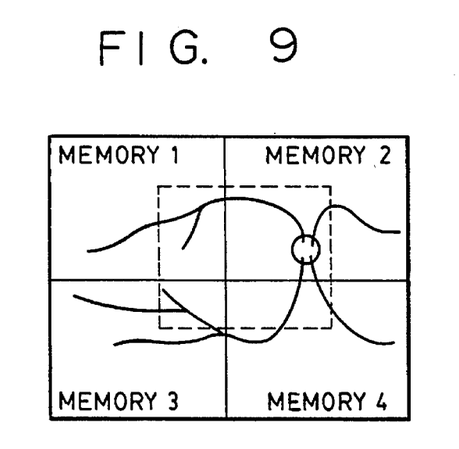
FIG. 9 is a diagram for explaining roaming.

Digital data representing a synthesized image is recognized by the image processing unit 2 as if digital data representing a plurality of images (digital data representing four images consisting of memories 1–4 in the example shown in FIG. 9) in the image memory 8 were digital data representing a large single image, as shown in FIG. 9. It is possible to provide a window, as shown by broken lines in FIG. 9, and to freely observe (roaming) the image from an up or down, right or left, or oblique direction on the image monitor 10 by a command from the command input unit 9.

All tile above-described image synthesis processing, roaming of an image, and the like are performed by the image processing unit 2.

The above-described images A' and B may be displayed in black-and white images, or displayed in colors having a complementary-color relationship with each other, such as green for the image A' and red for the image B. Such a color display results in easier registration of the images A' and B.

Figure 10:
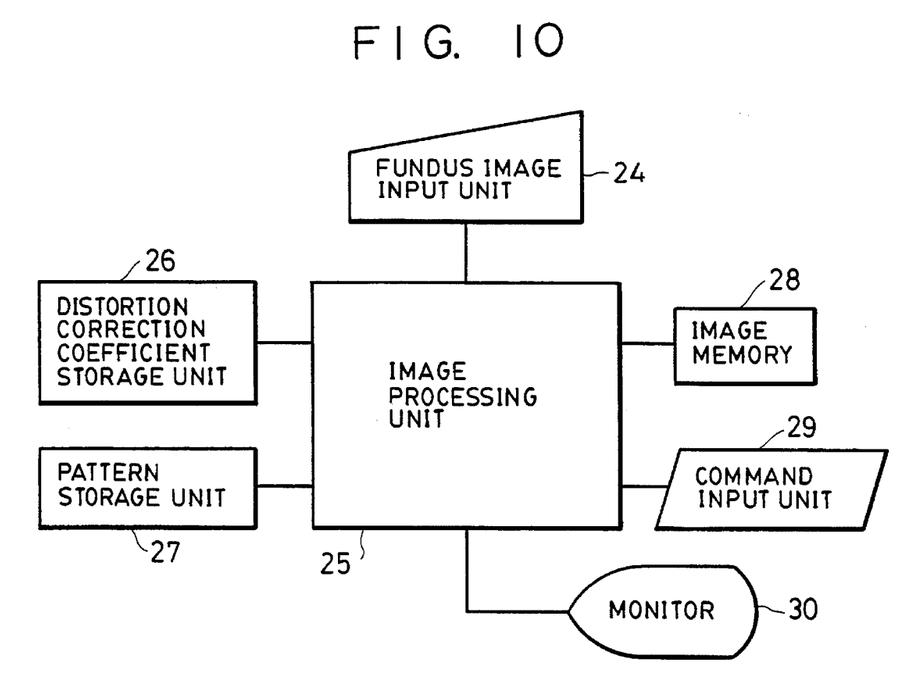
FIGS. 10 and 11 shows the entire configuration and process flowchart of a second embodiment of the present invention, respectively.
Figure 11:
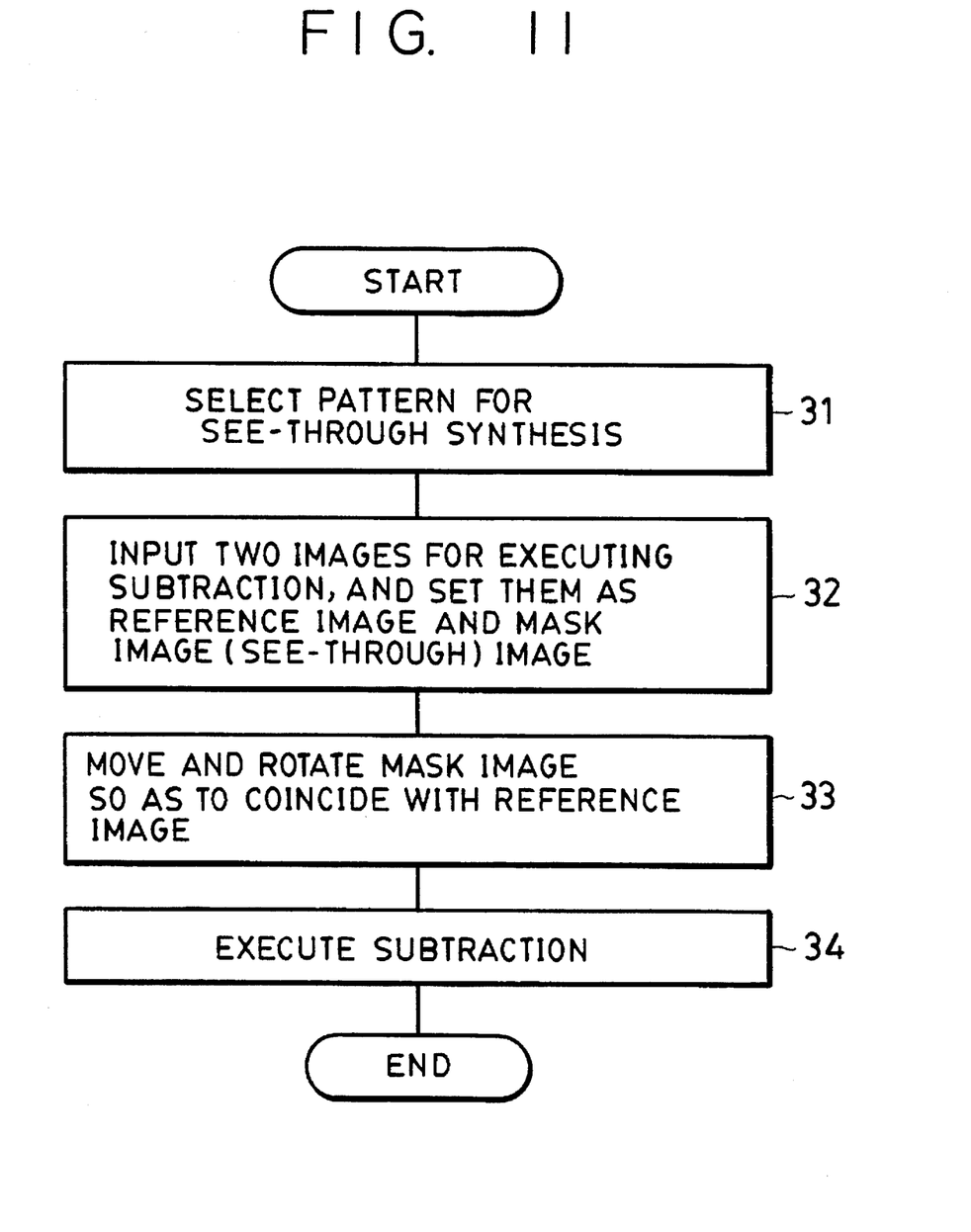

FIGS. 10 and 11 show a second embodiment of the present invention, in which subtraction between two images is performed. In FIG. 10, there are shown a fundus image input unit 24, an image processing unit 25, a distortion (distortion aberration) correction coefficient storage unit 26 for a fundus camera, a pattern storage unit 27 storing see-through patterns used for see-through synthesis, and an image memory 28. A command input unit 29 transmits various commands to the image processing unit 25. A monitor 30 outputs an image.

FIG. 11 is a flowchart showing a processing program of the second embodiment of the present invention.

A specific method of executing image processing will now been explained with reference to FIGS. 10 and 11. First, digital data representing a see-through pattern for the registration of digital data representing two images A and B to be subjected to image subtraction is selected from the pattern storage unit 27, and digital data representing a pattern image Z is loaded in the image memory 28 (step 31 in FIG. 11).

Digital data representing two fundus images A and B to be subjected to subtraction are then input from the fundus image input unit 24. Digital data representing the image B is stored without alteration as a reference image in the image memory 28. Digital data representing the image A is synthesized with digital data representing the pattern image Z, and digital data representing the resultant image is stored as digital data representing a mask image A' (step 32 in FIG. 11). As a specific example of the fundus image input unit 24, an image storage medium, such as an optical disk, a magnetooptical disk, a hard disk or the like may also be used in addition to those illustrated in the first embodiment.

In order to perform registration exactly, it is also possible to perform synthesis after correcting for distortion by the method shown in the first embodiment using the information in the distortion correction coefficient storage unit 26 for fundus cameras.

Subsequently, the registration of the mask image and the reference image is performed by the same method as shown in the first embodiment (step 33 in FIG. 11).

Image subtraction is then performed in a state in which the two images are perfectly matched with each other. At this time, which of the two images is to be subtracted is not limited unless it has previously been determined (step 34 in FIG. 11).

The subtraction may be performed by a usual subtraction operation known to those skilled in the art, or using a so-called exclusive OR operation in which only points where image data are different from each other are extracted for the two images.

Although, in the above-described embodiments, images for ophthalmology, more particularly, fundus images have been illustrated as a representative example, the present invention is not limited thereto.

The individual components in FIGS. 1 and 10 are well known in the image processing art and their specific construction and operation are not critical to the operation or best mode for carrying out the invention. Moreover, the steps illustrated in FIGS. 2 and 11 can be easily programmed into well known image processing units and since such programming per se is not part of this invention no further description thereof is deemed necessary.

What is claimed is:

1. An image processing apparatus comprising:

means for storing digital data representing a first image and a second image, each including at least an image portion of a common area, common to the first image and the second image;

means for storing digital data representing a mask pattern image for extracting only digital data representing a plurality of two-dimensionally discrete images from the first image;

means for generating digital data representing a synthesized image comprising a plurality of two-dimensionally discrete images extracted from the first image by the mask pattern image and arranged corresponding to the first image;

means for displaying the synthesized image and the second image in an overlapped state; and means for changing a positional relationship between the synthesized image and the second image displayed in the overlapped state by said means for displaying.

2. An image processing apparatus comprising:

means for storing digital data representing a mask pattern image for extracting only digital data representing a plurality of two-dimensionally discrete images from a first image;

means for generating digital data representing a synthesized image comprising a plurality of two-dimensionally discrete images extracted from the first image by the mask pattern image and arranged corresponding to the first image;

means for displaying the synthesized image and a second image in an overlapped state;

means for storing digital data representing the first and second images so that digital data representing a common image portion, common to the first and second images, is stored therein; and means for subjecting the digital data representing the first and second images to additive processing as image processing.

3. An image processing apparatus comprising:

means for storing digital data representing a mask pattern image for extracting only digital data representing a plurality of two-dimensionally discrete images from a first image;

means for generating digital data representing a synthesized image comprising a plurality of two-dimensionally discrete images extracted from the first image by the mask pattern image and arranged corresponding to the first image means for displaying the synthesized image and a second image in an overlapped state;

means for storing digital data representing the first and second images so that digital data representing a common image portion, common to the first and second images, is stored therein; and means for subjecting the digital data representing the first and second images to subtractive processing as image processing.

4. An image processing apparatus comprising:

means for storing digital data representing a mask pattern image for extracting only digital data representing a plurality of two-dimensionally discrete images from a first image;

means for generating digital data representing a synthesized image comprising a plurality of two-dimensionally discrete images extracted from the first image by the mask pattern image and arranged corresponding to the first image;

means for displaying the synthesized image and a second image in an overlapped state; and means for storing digital data representing the first and second images so that digital data representing a common image portion, common to the first and second images, is stored therein, and wherein the digital data representing the mask pattern image is digital data representing a mask pattern image for extracting only digital data representing a plurality of images from the digital data representing a first image having a checkered pattern.

5. An image processing apparatus comprising:

means for storing digital data representing a mask pattern image for extracting only digital data representing a plurality of two-dimensionally discrete images from a first image;

means for generating digital data representing a synthesized image comprising a plurality of two-dimensionally discrete images extracted from the first image by the mask pattern image and arranged corresponding to the first image;

means for displaying the synthesized image and a second image in an overlapped state; and means for storing digital data representing the first and second images so that digital data representing a common image portion, common to the first and second images, is stored therein, and wherein the first and second images are fundus images, and wherein said apparatus further comprises means for removing digital data representing an aperture mask from digital data representing fundus images.

6. An image processing apparatus comprising:

means for storing digital data representing a mask pattern image for extracting only digital data representing a plurality of two-dimensionally discrete images from a first image;

means for generating digital data representing a synthesized image comprising a plurality of two-dimensionally discrete images extracted from the first image by the mask pattern image and arranged corresponding to the first image;

means for displaying the synthesized image and a second image in an overlapped state; and means for storing digital data representing the first and second images so that digital data representing a common image portion, common to the first and second images, is stored therein, and wherein the first and second images are fundus images taken with a fundus camera, and wherein said apparatus further comprises means for correcting digital data representing fundus images having distortion aberration generated by the fundus camera.

7. An image processing apparatus comprising:

means for storing digital data representing first and second images so that at least digital data representing a common image portion, common to the first and second images, is stored therein;

means for generating digital data representing a third image comprising a plurality of two-dimensionally discrete images extracted from the first image and arranged corresponding to the first image;

means for overlapping the second image and the third image; and means for aligning the third image and the second image overlapped by said means for overlapping.

8. An apparatus comprising:

means for storing digital data representing first and second images so that digital data representing a common image portion, common to the first and second images, is stored therein;

means for generating digital data representing a third image comprising a plurality of two-dimensionally discrete images extracted from the first image and arranged corresponding to the first image; and means for aligning the third image and the second image, wherein said means for aligning comprises displaying means for displaying the second and third images in an overlapped state so that an operator can align the second and third images while watching the second and third images on said displaying means.

9. An apparatus comprising:

means for storing digital data representing first and second images so that digital data representing a common image portion, common to the first and second images, is stored therein;

means for generating digital data representing a third image comprising a plurality of two-dimensionally discrete images extracted from the first image and arranged corresponding to the first image;

means for aligning the third image and the second image; and means for synthesizing the first and second images according to an aligned state of the third image and the second image generated by means of said means for aligning.

10. An apparatus comprising:

means for storing digital data representing first and second images so that digital data representing a common image portion, common to the first and second images, is stored therein;

means for generating digital data representing a third image comprising a plurality of two-dimensionally discrete images extracted from the first image and arranged corresponding to the first image; and means for aligning the third image and the second image, wherein said means for storing stores digital data representing first and second fundus images as the first and second images.

* * * * *

UNITED STATES PATENT AND TRADEMARK OFFICE
CERTIFICATE OF CORRECTION

PATENT NO. : 5,481,653
DATED : January 2, 1996
INVENTOR(S) : Kenichi KASHIWAGI, et al.

It is certified that error appears in the above-indentified patent and that said Letters Patent is hereby corrected as shown below:

ON THE COVER PAGE

AT [54] Title:

"FORM" should read --FROM--.

COLUMN 1:

Line 2, "FORM" should read --FROM--.
Line 14, "subtract;ion" should read --subtraction--.
Line 48, "Disclosures" should read --disclosures--.

COLUMN 2:

Line 26, "from" should read --for--.

COLUMN 5:

Line 41, "tile" should read --the--.

UNITED STATES PATENT AND TRADEMARK OFFICE
CERTIFICATE OF CORRECTION

PATENT NO. : 5,481,653
DATED : January 2, 1996
INVENTOR(S) : Kenichi KASHIWAGI, et al.

It is certified that error appears in the above-indentified patent and that said Letters Patent is hereby corrected as shown below:

COLUMN 7:

Line 28, "image means" should read --image; means--.

Signed and Sealed this

Second Day of July, 1996

BRUCE LEHMAN

Attest:

Attesting Officer

Commissioner of Patents and Trademarks